US008062555B2

(12) United States Patent
Fresnais et al.

(10) Patent No.: US 8,062,555 B2
(45) Date of Patent: Nov. 22, 2011

(54) CO-ASSEMBLY METHOD AND CO-ASSEMBLED STRUCTURES MADE THEREBY

(75) Inventors: Jérôme Fresnais, Massy (FR); Jean-Francois Berret, Chaville (FR); Ling Qi, Orleans (FR); Jean-Paul Chapel, Bordeaux (FR); Jean-Christophe Castaing, Burlington, NJ (US)

(73) Assignee: Rhodia Operations, Aubervilliers (FR)

( * ) Notice: Subject to any disclaimer, the term of this patent is extended or adjusted under 35 U.S.C. 154(b) by 253 days.

(21) Appl. No.: 12/386,281

(22) Filed: Apr. 16, 2009

(65) Prior Publication Data

US 2010/0264375 A1    Oct. 21, 2010

(51) Int. Cl.
H01B 1/12 (2006.01)
H01B 1/08 (2006.01)
H01B 1/06 (2006.01)
C08J 7/16 (2006.01)
C08J 7/18 (2006.01)

(52) U.S. Cl. .................. 252/500; 521/27; 252/521.2
(58) Field of Classification Search .................. 252/500, 252/521.2; 521/27
See application file for complete search history.

(56) References Cited

U.S. PATENT DOCUMENTS

| 5,536,573 | A * | 7/1996 | Rubner et al. ............... 428/378 |
| 5,872,279 | A | 2/1999 | Sugiya et al. |
| 5,994,498 | A * | 11/1999 | Tripathy et al. ............... 528/422 |
| 7,012,114 | B2 * | 3/2006 | Bett et al. ..................... 524/458 |
| 7,112,361 | B2 * | 9/2006 | Lynn et al. .................... 428/212 |
| 7,371,719 | B2 | 5/2008 | Stupp et al. |
| 2002/0149656 | A1 * | 10/2002 | Nohr et al. ..................... 347/95 |
| 2003/0082237 | A1 | 5/2003 | Cha et al. |
| 2004/0030030 | A1 * | 2/2004 | Castaing et al. ............. 524/500 |
| 2005/0090008 | A1 * | 4/2005 | Segura et al. ................. 435/459 |
| 2005/0127331 | A1 * | 6/2005 | Yang et al. .................... 252/500 |
| 2006/0089508 | A1 | 4/2006 | Wo et al. |
| 2007/0128175 | A1 | 6/2007 | Ozbas et al. |
| 2007/0274942 | A1 * | 11/2007 | Morvan et al. ............. 424/70.19 |
| 2008/0058229 | A1 | 3/2008 | Berkland et al. |
| 2008/0096271 | A1 * | 4/2008 | Zhou et al. .................. 435/287.1 |
| 2008/0124467 | A1 * | 5/2008 | Chapel et al. ................. 427/331 |
| 2008/0152810 | A1 | 6/2008 | Nohr et al. |
| 2008/0248209 | A1 * | 10/2008 | Chapel et al. ............. 427/385.5 |
| 2008/0299177 | A1 | 12/2008 | Hardy |

FOREIGN PATENT DOCUMENTS

WO    2006/047545 A2    5/2006

OTHER PUBLICATIONS

Jan, Studies of Block Copolypeptide Synthesis, Self-Assembly, and Structure-Directing Ability, Texas A&M University, Dissertation [online], Dec. 2006 [retrieved on Aug. 30, 2009], Retrieved from the Internet; <URL:https://etd.tamu.edu/bitstream/handle/1969.1/4939/JAN-DISSERTATION.pdf?sequence=2>.

* cited by examiner

*Primary Examiner* — Douglas Mc Ginty (57) ABSTRACT

A co-assembly method includes, in an aqueous polyelectrolyte composition comprising: (a) a first polyelectrolyte dispersed in the composition and having a net electric charge of a first polarity, (b) a second polyelectrolyte dispersed in the composition and having a net electric charge of a second polarity, wherein the second polarity is opposite the first polarity, and (c) an electrolyte dissolved in the composition in a concentration effective to prevent co-assembly of the polyelectrolytes, the step of allowing co-assembly of the polyelectrolytes by: (1) decreasing the concentration of the electrolyte, or (2) forming an interface between the aqueous polyelectrolyte composition and a surface of a solid substrate or of a second liquid phase, wherein the surface has an affinity for at least one of the polyelectrolytes, or (3) decreasing the concentration of the electrolyte and forming such an interface.

21 Claims, 3 Drawing Sheets

CO-ASSEMBLY METHOD AND CO-ASSEMBLED STRUCTURES MADE THEREBY

FIELD OF THE INVENTION

This invention relates to a co-assembly method and co-assembled structures made thereby.

BACKGROUND OF THE INVENTION

Inorganic particles are expecting to play an important role in future nanotechnologies. Mineral or inorganic synthesis has advanced during the last years, in particular with respect to the development of "soft chemistry" and the systematic use of aqueous media as synthesis solvent. Particles at the nanometer length scale, i.e. with typical sizes in the range of 10 nm, are now available for many metals, including gold and platinum, and metal oxides, including cerium, titanium and iron oxides. However, substantial difficulties remain with respect to reliably producing stable particles in the submicrometric range, i.e. in the range of from about 20 nm to about 1000 nm. The submicrometric size range is interesting for many applications, including chemical mechanical polishing, anti-UV filters, and nanocomposite reinforcements. There is by now a need to fill this gap by providing inorganic colloids within the submicrometric size range in a simple and inexpensive manner.

The possibility of using inorganic nanoparticles as building blocks and of their co-assembly with polymers, for the design and fabrication of colloidal and supracolloidal assemblies has been recognized, A. K. Boal, F. Ilhan, J. E. DeRouchey, T. Thurn-Albrecht, T. P. Russell and V. M. Rotello, "*Self-assembly of nanoparticles into structured spherical and network aggregates*," Nature 404, 746-748 (2000), and techniques for controlled clustering of nanoparticles have been elaborated. J. F. Berret, N. Schonbeck, F. Gazeau, D. El Kharrat, O. Sandre, A. Vacher and M. Airiau, "*Controlled clustering of superparamagnetic nanoparticles using block copolymers: Design of new contrast agents for magnetic resonance imaging*," Journal of the American Chemical Society 128, 1755-1761 (2006), J. F. Berret, A. Sehgal, M. Morvan, O. Sandre, A. Vacher and M. Airiau, "*Stable oxide nanoparticle clusters obtained by complexation*," Journal of Colloid and Interface Science 303, 315-318 (2006).

US 2005176863 directed to Rare Earth Aggregate Formulation Using D-Block Copolymers, and WO 2008008354 directed to Aqueous Dispersions of Hybrid Coacervates Delivering Specific Properties Onto Solid Surfaces and Comprising Inorganic Solid Particles and a Copolymer each describe processes for making nanoparticle clusters by mixing oppositely charged nanoparticles and block copolymers.

Polyelectrolyte layers have been constructed from oppositely charged polyelectrolytes, G. Decher, "*Fuzzy Nanoassemblies: Toward Layered Polymeric Multicomposites*," Science 277, 1232-1237 (1997), F. Caruso, R. A. Caruso and H. Möhwald, "*Nanoengineering of Organic and Hybrid Hollow Spheres by Colloidal Templating*," Science 282, 1111-1114 (1998), including stacked assemblies of alternating layers of oppositely charged polyelectrolytes, N. Laugel, C. Betscha, M. Winterhalter, J.-C. Voegel, P. Schaaf and V. Ball, "*Relationship between the Growth Regime of Polyelectrolyte Multilayers and the Polyanion/Polycation Complexation Enthalpy*," J. Phys. Chem. B 110, 19443-19449 (2006).

SUMMARY OF THE INVENTION

In a first aspect, the present invention is directed to a co-assembly method, comprising the step of allowing, in an aqueous polyelectrolyte composition comprising (a) a first polyelectrolyte dispersed in the composition and having a net electric charge of a first polarity,
(b) a second polyelectrolyte dispersed in the composition and having a net electric charge of a second polarity, wherein the second polarity is opposite the first polarity, and
(c) an electrolyte dissolved in the composition in a concentration effective to prevent co-assembly of the polyelectrolytes, co-assembly of the polyelectrolytes by:
(1) decreasing the concentration of the electrolyte, or
(2) forming an interface between the aqueous polyelectrolyte composition and a surface of a solid substrate or of a second liquid phase, wherein the surface has an affinity for at least one of the polyelectrolytes, or
(3) (1) and (2).

In one embodiment, the first and second polyelectrolytes each comprise respective polyelectrolytic organic macromolecules.

In another embodiment, the first and second polyelectrolytes each comprise respective nanoscale polyelectrolytic inorganic particles.

In another embodiment, one polyelectrolyte comprises nanoscale polyelectrolytic inorganic particles and the other polyelectrolyte comprises polyelectrolytic organic macromolecules.

In one embodiment, the aqueous polyelectrolyte composition further comprises at least one additional polyelectrolyte in addition to the first and second polyelectrolytes, each said additional polyelectrolyte having a net electric charge of the first polarity or of the second polarity, the electrolyte is dissolved in the aqueous polyelectrolyte composition in a concentration effective to prevent co-assembly of first, second, and additional polyelectrolytes, and the step of decreasing the concentration of the dissolved electrolyte allows co-assembly of first, second, and additional polyelectrolytes.

The method of the present invention allows controlled formation and growth of structures comprising the polyelectrolytes.

In one embodiment, co-assembly of polyelectrolytes forms discrete submicrometic polyelectrolyte clusters in the bulk aqueous polyelectrolyte composition.

In another embodiment, the method comprises the step (2) of forming an interface between the aqueous polyelectrolyte composition and a surface of a solid substrate or of a second liquid phase and co-assembly of the polyelectrolytes forms a polyelectrolyte layer at the interface.

In one embodiment, the interface between the aqueous polyelectrolyte composition and the surface of a solid substrate and the polyelectrolyte layer is disposed on at least a portion of the surface of the solid substrate.

In a second aspect, the present invention is directed to an aqueous polyelectrolyte composition comprising:
(a) a first polyelectrolyte dispersed in the composition and having a net electric charge of a first polarity,
(b) a second polyelectrolyte dispersed in the composition and having a net electric charge of a second polarity, wherein the second polarity is opposite the first polarity, and
(c) an electrolyte dissolved in the composition in a concentration effective to prevent co-assembly of the polyelectrolytes.

DETAILED DESCRIPTION OF INVENTION

As used herein in reference to two polyelectrolytes of opposite polarity, the term "co-assembly" denotes attractive association of the polyelectrolytes to form condensed polyelectrolyte structures that comprise the two polyelectrolytes in combination. In one embodiment, co-assembly of the polyelectrolytes forms discrete polyelectrolyte clusters. In another embodiment, co-assembly of the polyelectrolytes forms a polyelectrolyte layer or film. In one embodiment, the polyelectrolyte structure comprises a mixture of electrolytic macromolecules. In another embodiment, the polyelectrolytic structure comprises a mixture of polyelectrolytic inorganic particles and polyelectrolytic organic macromolecules.

As used herein, the term "hybrid" in reference to a polyelectrolyte structure means that the structure comprises at least two different types of polyelectrolyte, such as a structure comprising a polyelectrolytic inorganic particle and polyelectrolytic organic macromolecule, in combination.

As used herein, the term "electric charge" means an electrical imbalance, resulting from, in the case of a negative electric charge, an excess or high relative density of electrons, and in the case of a positive electrical charge, a deficiency or low relative density of electrons, in each case relative to the number or density of protons within a given frame of reference.

As used herein in reference to an object, such as a surface, a polymer, or a particle, the term "net electric charge" means of the result obtained by arithmetically summing of all of the positive and negative electric charges on the relevant interface of the object, typically, an external surface of the object. Net electric charge of an object can be quantified by measuring, in the case of a particle or polymer molecule, the zeta potential of the particle or polymer molecule, or, in the case of a surface, the streaming potential of the surface, each according to known methods, such as that described in "Zeta Potential in Colloid Science" (Colloid Sciences Series) by Robert J. Hunter, Academic Pr; New Ed edition (January 1989) pp. 59-129.

As used herein in reference to an electric charge, the term "polarity" means the particular state, that is, either "positive" or "negative", of the electrical charge.

In many cases, the polarity of a net electric charge can be reliably predicted without calculating or measuring the net electric charge, based on a qualitative assessment of the relative amounts of cationic and anionic sites on the relevant interface of an object. For example, the polarity of the net electric charge of a surface bearing a predominance of anionic sites would be negative. Similarly, the polarity of the net electrical charge of a surface bearing a predominance of cationic sites would be positive.

As used herein, the indication that the polarity of a second net electrical charge is the "opposite" of the polarity of a first net electrical charge means that polarity of one of the respective net electrical charge is negative and the polarity of the other net electrical charge is positive.

A. Aqueous Medium

The aqueous polyelectrolyte composition comprises an aqueous medium. Typically, the aqueous medium comprises at least 40 percent by weight ("wt %"), more typically at least 50 wt % water and even more typically at least 60 wt % water. In one embodiment, the aqueous medium consists essentially of water. The aqueous medium may optionally further comprise one or more water miscible organic liquids, such as for example, tetrahydrofuran, N,N-dimethylformamide, acetonitrile, acetone, $(C_1$-$C_8)$alkanols such as methanol, ethanol, 2-propanol and diols such as ethylene glycol or, propylene glycol.

In one embodiment, the aqueous medium comprises, based on 100 parts by weight ("pbw") of such aqueous medium, from about 0 to about 100 pbw, more typically from about 40 to about 100 pbw, and still more typically from about 50 to about 100 pbw water, and from 0 to about 90 pbw, more typically from 0 to about 60 pbw, and still more typically from about 0 to about 50 pbw, of one or more water miscible organic liquids.

B. Polyelectrolytes

As used herein, the terms "polyelectrolyte" and "polyelectrolytic" each refer to an object having greater than or equal to 2, more typically greater than or equal to 3, even more typically greater than or equal to 4, electrolytic sites per object. As used herein, the term "electrolytic site" means a chemical substituent group, such as for example, a hydroxyl group or quaternary ammonium group, that dissociates in water under the conditions of interest to give ionic species. Suitable objects include inorganic particles and organic macromolecules. In one embodiment, the first and second polyelectrolytes are each independently selected from the group consisting of polyelectrolytic nanoscale inorganic particles, each having a plurality of electrolytic sites per particle, and polyelectrolytic organic macromolecules, each having a plurality of electrolytic sites per molecule, and mixtures thereof. In each case, the polyelectrolyte is water dispersible. As used herein, the term "water dispersible" means capable of being dissolved in water or, in the case of water insoluble objects, of forming a stable or substantially stable dispersion in water, such as for example a colloidal dispersion.

B.1. Nanoscale Polyelectrolytic Inorganic Particles

Suitable polyelectrolytic nanoscale inorganic particles are polyelectrolytic nanoscale inorganic particles of any gross morphology, including amorphous particles and shaped particles, such as spheres, rods, needles, and tubes, having a mean characteristic maximum dimension of less than or equal to about 1000 nanometers ("nm"). The characteristic maximum dimension of a given type of particle, such as for example, the diameter of spherical particle or length of a rod-shaped particle, can be characterized by known means, for example, atomic force microscopy, scanning electron microscopy, or transmission electron microscopy The maximum characteristic dimension of a given type of particle or of a given macromolecule in a liquid medium can be characterized by known means, such as, for example, static and/or dynamic light scattering measurements.

As used herein the term "submicrometic" means that the object has a characteristic maximum dimension of less than 1 micron.

As used herein, the term "nanoscale" in reference to objects means that the characteristic maximum dimension of such objects is at most submicrometic, more typically from about 1 to about 100 nanometers ("nm"), even more typically from about 1 to about 50 nm, and still more typically from about 1 to about 20 nm.

Suitable inorganic particles include metal particles, semiconductor particles, and metal oxide particles.

In one embodiment, the inorganic particles comprise metallic particles. Suitable metal particles, include, for example, gold or platinum particles.

In one embodiment, the inorganic particles comprise particles semiconductor materials. Suitable semiconductor materials include, for example, silicon, silicon carbide, gallium arsenide, indium arsenide, indium phosphide, indium arsenide antimonide, aluminum gallium arsenide nitride, cadmium selenide, cadmium sulfide, lead sulfide, or mercury zinc telluride particles.

In one embodiment, the inorganic particles comprise "quantum dots", that is, nanoscale particles of semiconductor material that confine electrons to a three dimensional potential well. Quantum dots exhibit interesting properties, such as, for example, luminescence, due to the phenomenon of "quantum confinement", that is, confinement of excitons within the volume of the quantum dot particle, see, for example, Reed, Mark S., Quantum Dots, *Scientific American*, pp. 118-123 (January 1993), and Guyot-Sionnest, Philippe, Quantum Dots: A New Quantum State?, *Nature Materials, Vol.* 4, pp. 653-654 (September 2005).

In one embodiment, the nanoscale inorganic particles comprise an inorganic oxide. Suitable inorganic oxides include oxides of single elements, such as cerium oxide, titanium oxide, zirconium oxide, hafnium oxide, tantalum oxide, tungsten oxide and bismuth oxide, zinc oxide, indium oxide, and tin oxide, iron oxide, silica, and mixtures of such oxides, as well as oxides of mixtures of such elements, such as cerium-zirconium oxides. In one embodiment, the inorganic oxide is selected from iron oxide, zirconium oxide, and cerium oxide.

In one embodiment, the nanoscale inorganic particles comprise an inorganic oxide, excluding iron oxide. Suitable inorganic oxides other than iron oxide include oxides of single elements, such as cerium oxide, titanium oxide, zirconium oxide, hafnium oxide, tantalum oxide, tungsten oxide and bismuth oxide, zinc oxide, indium oxide, and tin oxide, silica, and mixtures of such oxides, as well as oxides of mixtures of such elements, such as cerium-zirconium oxides. In one embodiment, the inorganic oxide is selected from zirconium oxide and cerium oxide.

Suitable inorganic particles can be made by known means. For example, methods for making suitable inorganic oxide particles are known, such as sol-gel techniques, direct hydrolysis of metal alkoxides by water addition, forced hydrolysis of metal salts or by reaction of metal alkoxides with metal halides. In one embodiment, the nanoscale inorganic oxide particles are made by precipitation of a cerium salt, as described in U.S. Pat. No. 5,308,548, issued May 3, 1994 to Jean-Yves Chang-Ching for "Preparing a Dispersible, Sol-Forming Cerium (IV) Composition", the disclosure of which is hereby incorporated herein by reference. Methods for making suitable iron oxide nanoscale particles are also known, see Massart, R. C. R. Acad. Sci. (Paris) 1980, 291, 1-3, and Bee, A.; Massart, R.; Neveu, S. J. Magn. Magn. Mat. 1995, 149, 6-9.

The polyelectrolytic nanoscale inorganic particles may be polyelectrolytic per se, due, for example, to the presence of linked or absorbed inorganic ions, such as, for example, metal ions, nitrate ions, or may be rendered polyelectrolytic by treatment of the exterior surfaces of nanoscale inorganic particles with, for example, an ionic organic compound, such as acrylic acid, polyacrylic acid, or citric acid, to form ionic organic substituent groups on the exterior surfaces of the nanoscale particles. Suitable surface treatment techniques are know, see, for example, Sehgal, A., Lalatonne, Y., Berret, J-F and Morvan, M., *Langmuir* 21, pp. 9359-9364 (2005).

In one embodiment, the polyelectrolytic nanoscale inorganic particles are available in the form of an aqueous "sol" or colloidal dispersion that is stabilized by electrostatic charges and/or hydrostatic forces and subject to destabilization by perturbations of pH, ionic strength, and concentration.

In one embodiment, the aqueous colloidal dispersion of nanoscale inorganic particle comprises, based on the total weight of the sol, from greater than 0 to about 10 wt %, more typically from about 0.01 to about 5 wt %, even more typically from about 0.01 to about 1.0 wt % nanoscale inorganic oxide particles B.2. Polyelectrolytic Organic Macromolecules As used herein, the term "macromolecule" means a molecule of relatively high molecular mass, the structure of which comprises multiple constitutional units derived, actually or conceptually, from molecules of relatively low molecular weight. In many cases, a molecule can be regarded as having a relatively high molecular weight if the addition or removal of from one to several constitutional units of the molecule has a negligible effect on the properties of the molecule.

Suitable polyelectrolytic organic macromolecules include natural polymers, such as, for example, biopolymers, and synthetic polymers.

The polyelectrolytic macromolecule can be any water dispersible polyelectrolytic macromolecule, including water soluble polyelectrolytic macromolecules as well as water insoluble polyelectrolytic macromolecules, provided that such water insoluble polyelectrolytic macromolecules are water dispersible, such as for example, in the form of a colloidal dispersion.

In one embodiment, the polyelectrolytic organic macromolecule is selected from the group consisting of carbohydrate macromolecules, protein macromolecules, including protein conjugates, such as metalloproteins, lipoproteins, and glycoproteins, and nucleic acid macromolecules, such as DNA, RNA, and fragments thereof, as well as virus macromolecules, and mixtures of any of the foregoing.

In one embodiment, the polyelectrolytic organic macromolecule comprises a synthetic polymer.

Suitable synthetic polymers include homopolymers, that is, polymers derived from one species of monomer, and copolymers, that is, polymers derived from more than one species of monomer, wherein, in each case, the term "monomer" means a molecule that can undergo polymerization to contribute constitutional units to a polymer, and the term "species of monomer" means an monomer from which the constitutional units of the relevant polymer are actually derived, or a "hypothetical monomer", that is, a conceptual monomer from which the constitutional units of the relevant polymer can be conceptually derived. Suitable synthetic copolymers include random copolymers, alternating copolymers, graft copolymers, and block copolymers.

Suitable synthetic polymers include linear polymers and non-linear polymers. Non-linear polymers include, for example, branched polymers, comb polymers, star polymers, dendritic polymers, ladder polymers, and spiro polymers, as well as crosslinked polymer networks.

In one embodiment, the polyelectrolytic organic macromolecule comprises one or more synthetic homopolymers, each of which is homopolymer of monomeric units, each of which bear an electrolytic group, typically an ionic substituent group, that is, a cationic substituent group or an ionic substituent group. In one embodiment, the polymer comprises one or more polycationic homopolymers, each of which is a homopolymer of cationic monomeric units, each of which bear a cationic substituent group. In one embodiment, the polymer comprises one or more polyanionic homopolymers, each of which is a homopolymer of anionic monomeric units, each of which bear an anionic substituent group.

In one embodiment, the polyelectrolytic organic macromolecule comprises one or more copolymers that comprises an electrically charged part and electrically neutral part. In one embodiment, the polymer comprises one or more polycationic copolymers, each of which is a copolymer comprising cationic monomeric units, each of which bear a cationic substituent group, and neutral monomeric units. In one embodiment, the polymer comprises one or more polyanionic copolymers, each of which is a copolymer comprising anionic monomeric units, each of which bear an anionic substituent group, and neutral monomeric units. Typically, the polar portions of the copolymer are ionic substituent groups that ionize in an aqueous medium to form electrically charged sites on the copolymer.

In one embodiment, the synthetic polymer is a copolymer that comprises at least two different types of polymeric segments ("blocks") that are joined with each other in some arrangement. The blocks differ in that each of the blocks comprises constitutional units having at least one feature that is not present in the other blocks, typically, as a result of having been derived from different monomers.

In one embodiment, the copolymer is a block copolymer comprising at least two types of blocks, denoted for convenience as "A" blocks and "B" blocks. In one embodiment, each of such blocks is derived from a single type of monomer. Optionally, each block may itself be copolymeric, that is, derived from more than one type of monomer. Copolymeric blocks may, optionally, exhibit specific arrangements, for example, random, alternating, a composition gradient, of constitutional units within a given block.

The blocks of a block copolymer may be joined to each other in different arrangements. In one embodiment, the synthetic polymer is a linear "di-block" copolymer comprising A blocks and B blocks joined end to end. In one embodiment, the synthetic polymer is a non-linear block copolymer, such as for example, a comb copolymer or graft copolymer comprising a backbone and side chains wherein the A blocks correspond to the backbone and the B blocks correspond to side chains, or vice versa.

In one embodiment, the A blocks of a block copolymer are polyelectrolytic (polyanionic or polycationic) in pH conditions of the aqueous polyelectrolyte composition. That means that the A blocks comprise ionic (anionic or cationic) constitutional units regardless of the pH, or that the A blocks comprises repetitive units that may be neutral or ionic (anionic or cationic) depending on the pH of the formulation (that is, the units are potentially ionic). A constitutional unit that may be neutral or ionic (anionic or cationic), depending on the pH of the composition, will be thereafter referred to as an ionic unit (anionic or cationic), or as a unit deriving from an ionic monomer (anionic or cationic), whether it is in a neutral form or in an ionic form (anionic or cationic).

Suitable block copolymers are described in US published application 2005/0176863 and in U.S. application Ser. No. 11/445,115 filed on Jan. 6, 2006, U.S. Pat. No. 6,933,340, both applications and patent being also incorporated by reference in the present description.

In one embodiment, the homopolymer or the polyelectrolytic part of the copolymer is polycationic and comprises constitutional units derived from cationic monomers. Some preferred cationic monomers comprise an ammonium group of formula —$NR_3^+$, wherein R, which is identical or different, represents a hydrogen atom, an alkyl group comprising 1 to 10 carbon atoms, or a benzyl group, optionally carrying a hydroxyl group, and may comprise an anion (counter-ion). Examples of anions are halides such as chloride and bromides, sulphates, hydrosulphates, alkylsulphates (for example comprising 1 to 6 carbon atoms), phosphates, citrates, formates, and acetates.

Suitable cationic monomers include, for example:
aminoalkyl(meth)acrylates, aminoalkyl(meth)acrylamides,
monomers, including particularly (meth)acrylates, and (meth)acrylamides derivatives, comprising at least one secondary, tertiary or quaternary amine function, or a heterocyclic group containing a nitrogen atom, vinylamine or ethylenimine;
diallyldialkyl ammonium salts; and
their mixtures, their salts, and macromonomers deriving from therefrom.

Specific examples of cationic monomers include:
dimethylaminoethyl(meth)acrylate, dimethylaminopropyl (meth)acrylate, ditertiobutylaminoethyl(meth)acrylate, dimethylaminomethyl(meth)acrylamide, dimethylaminopropyl (meth)acrylamide;
ethylenimine, vinylamine, 2-vinylpyridine, 4-vinylpyridine;
trimethylammonium ethyl(meth)acrylate chloride, trimethylammonium ethyl(meth)acrylate methyl sulphate, dimethylammonium ethyl(meth)acrylate benzyl chloride, 4-benzoylbenzyl dimethylammonium ethyl acrylate chloride, trimethyl ammonium ethyl(meth)acrylamido (also called 2-(acryloxy)ethyltrimethylammonium, TMAEAMS, or Padamquat) chloride, trimethylammonium ethyl(meth)acrylate (also called 2-(acryloxy)ethyltrimethylammonium, TMAE-AMS, or Padamquat) methyl sulphate, trimethyl ammonium propyl(meth)acrylamido chloride, vinylbenzyl trimethyl ammonium chloride,
diallyldimethyl ammonium chloride,
monomers having the following formula:

wherein
$R_1$ is a hydrogen atom or a methyl or ethyl group;
$R_2$, $R_3$, $R_4$, $R_5$ and $R_6$, which are identical or different, are linear or branched $C_1$-$C_6$, preferably $C_1$-$C_4$, alkyl, hydroxyalkyl or aminoalkyl groups;
m is an integer from 1 to 10, for example 1;
-n is an integer from 1 to 6, preferably 2 to 4;

Z represents a —C(O)O— or —C(O)NH— group or an oxygen atom;

A represents a $(CH_2)_p$ group, p being an integer from 1 to 6, preferably from 2 to 4;

B represents a linear or branched $C_2$-$C_{12}$, advantageously $C_3$-$C_6$, polymethylene chain optionally interrupted by one or more heteroatoms or heterogroups, in particular O or NH, and optionally substituted by one or more hydroxyl or amino groups, preferably hydroxyl groups; and X, which are identical or different, represent counter-ions, and their mixtures, and macromonomers deriving therefrom.

In another embodiment of the invention, the homopolymer or the polyelectrolytic part of the copolymer is polyanionic and comprises constitutional units derived from anionic monomers. Suitable anionic monomers include, for example:

alpha-ethylenically-unsaturated monomers comprising a phosphate or phosphonate group, alpha-ethylenically-unsaturated monocarboxylic acids, monoalkylesters of alpha-ethylenically-unsaturated dicarboxylic acids, monoalkylamides of alpha-ethylenically-unsaturated dicarboxylic acids, alpha-ethylenically-unsaturated compounds comprising a sulphonic acid group, and salts of alpha-ethylenically-unsaturated compounds comprising a sulphonic acid group.

In one embodiment, the anionic monomeric units of the polymer are derived from one or more anionic monomer selected from the group consisting of:

acrylic acid, methacrylic acid, salts of acrylic acid, salts of methacrylic acid, vinyl sulphonic acid, salts of vinyl sulphonic acid, vinylbenzene sulphonic acid, salts of vinylbenzene sulphonic acid, alpha-acrylamidomethylpropanesulphonic acid, salts of alpha-acrylamidomethylpropanesulphonic acid 2-sulphoethyl methacrylate, salts of 2-sulphoethyl methacrylate, acrylamido-2-methylpropanesulphonic acid (AMPS), salts of acrylamido-2-methylpropanesulphonic acid, and styrenesulfonate (SS), and salts of SS.

The non-polyelectrolytic part of the copolymer is neutral in pH conditions of the formulation and comprises constitutional units derived from neutral monomers that remain neutral whatever the pH. Suitable neutral monomers include, for example:

alkyl oxides, such as ethylene oxide, and propylene oxide, acrylamide, methacrylamide, amides of alpha-ethylenically-unsaturated, preferably mono-alpha-ethylenically-unsaturated, monocarboxylic acids, esters of an alpha-ethylenically-unsaturated, preferably mono-alpha-ethylenically-unsaturated, monocarboxylic acid, for example alkyl esters such as such as methylacrylate, ethylacrylate, n-propylacrylate, n-butylacrylate, methylmethacrylate, ethylmethacrylate, n-propylmethacrylate, n-butylmethacrylate, 2-ethyl-hexyl acrylate, or hydroxyalkyl esters such as 2-hydroxyethylacrylate, polyethylene and/or polypropylene oxide (meth)acrylates (i.e. polyethoxylated and/or polypropoxylated (meth)acrylic acid), vinyl alcohol,
vinyl pyrrolidone,
vinyl acetate,
vinyl versatate, vinyl nitriles, preferably comprising from 3 to 12 carbon atoms, acrylonitrile, vinylamine amides, vinyl aromatic compounds, such as styrene, and mixtures thereof.

In one embodiment, the polyelectrolytic polymer comprises a polycationic homopolymer, such as, for example, a poly(trimethylammonium ethyl acrylate methyl sulfate) homopolymer.

In one embodiment, the polyelectrolytic polymer is a block copolymer having cationic blocks and neutral blocks, such as for example, a poly(trimethylammonium ethyl acrylate methyl sulfate)-b-polyacrylamide) block copolymer.

In one embodiment, the polyelectrolytic polymer comprises a polyanionic homopolymer, such as, for example, a poly(styrene sulfonate) homopolymer.

In one embodiment, the polyelectrolytic polymer is a block copolymer having anionic blocks and neutral blocks, such as for example, a poly(styrene sulfonate)-b-polyacrylamide) block copolymer.

A copolymer having a net positive polarity, that is, where the major portion of the electrically charged units of the copolymer comprise cationic substituent groups, may, optionally, comprise a minor portion of the electrically charged units of the copolymer comprise anionic substituent groups.

A copolymer having a net negative polarity, that is, where the major portion of the electrically charged units of the copolymer comprise anionic substituent groups may, optionally, comprise a minor portion of the electrically charged units of the copolymer comprise cationic substituent groups.

The electrolytic portions of the polymer that dissociate under the pH conditions of the aqueous are usually considered as water-soluble. Thus, part A is usually considered as water-soluble. In a preferred embodiment of the invention, part B of the polymer is water-soluble, or hydrophilic. Water-solubility of a part refers to the water-solubility that the part would have without the other part(s), that is the water-solubility of a polymer consisting of the same repeating units and having the same molecular weight as the part. In one embodiment, a water-soluble polymer, is one that does not phase separate macroscopically in water at a concentration of about 0.01% by weight at a temperature from 20° C. to 30° C. In one embodiment, the water-soluble polymer does not phase separate macroscopically in water at a concentration of up to about 1.0% by weight at a temperature from 20° C. to 30° C.

In one embodiment, the copolymer is made by anionic polymerization with sequential addition of two monomers as described for example by Schmolka, J. Am. Oil Chem. Soc. 1977, 54, 110; or alternatively Wilczek-Veraet et al., Macromolecules 1996, 29, 4036. Another method which can be used consists in initiating the polymerization of a part polymer at each of the ends of another part polymer as described for example by Katayose and Kataoka, Proc. Intern. Symp. Control. Rel. Bioact. Materials, 1996, 23, 899.

In one embodiment, the copolymer is made by living or controlled polymerization as defined by Quirk and Lee (Polymer International 27, 359 (1992)). Indeed, this particular method makes it possible to prepare polymers with a narrow dispersity and in which the length and the composition of the parts are controlled by the stoichiometry and the degree of conversion. In the context of this type of polymerization, there are more particularly recommended the copolymers which can be obtained by any so-called living or controlled polymerization method such as, for example:

free-radical polymerization controlled by xanthates according to the teaching of Application WO 98/58974 and U.S. Pat. No. 6,153,705, or free-radical polymerization controlled by dithioesters according to the teaching of Application WO 98/01478.

Block copolymers obtained by a living or controlled free-radical polymerization process may comprise at least one transfer agent group at an end of the polymer chain. In one embodiment, such a group is removed or deactivated subsequent to polymerization.

Living or controlled free-radical polymerization processes involve using a transfer agent, and implementing addition of different monomers to obtain block copolymers.

The preferred transfer agents for implementing the controlled polymerization process are dithioesters, thioethers-thiones, dithiocarbamates, or xanthates. The preferred polymerization is the living radical polymerization using xanthates.

The weight average molecular weight of the polymer is typically from about 1000 to 2,000,000, more typically from about 1000 to 1,000,000 g/mol. Typically the respective blocks of a block copolymer have a weight average molecular weight above about 500 g/mol.

The molecular weight of a polymer is typically determined by fractionating a solution of the polymer using, for example, size exclusion chromatography, and then determining the molecular weight of each of such polymer fractions, for example, by measuring the intensity of light scattering by the fractions or by measuring the refractive index of the fractions and comparing the refractive index results to those obtained for a polymer of known molecular weight.

A polymer solution in accordance with the invention may be prepared by adding the desired amount of polymers in a powder form to deionized water, preferably having a conductivity of MΩ (Purification ion-exchange filter, Millipore). The polymer and water are preferably mixed for about 24 hours to achieve homogeneity with a concentration preferably in the range of between about 1% or less.

In one embodiment, the aqueous polymer solution or dispersion comprises from about 0.01% to about 10 wt %, more typically from about 0.1% to about 5 wt %, and even more typically from about 0.01% to about 1 wt %, of the polymer in an aqueous medium.

The pH of the aqueous polymer solution or dispersion may be any pH in which the components are not degraded, typically, a pH of from about 5 to about 9.

C. Electrolyte

Suitable electrolytes are those that do not destabilize the dispersed first polyelectrolyte or the dispersed second polyelectrolyte when present in an amount effective to screen electrostatic interaction between the first and second polyelectrolytes. The electrolyte typically comprises a salt having a cationic component and an anionic component. Suitable cations may be monovalent or multivalent, may be organic or inorganic, and include, for example, sodium, potassium, lithium, calcium, magnesium, cesium, and lithium cations, as well as mono-, di- tri- or quaternary ammonium or pyridinium cation. Suitable anions may be a monovalent or multivalent, may be organic or inorganic, and include, for example, chloride, sulfate, nitrate, nitrite, carbonate, citrate, cyanate acetate, benzoate, tartarate, oxalate, phosphate, and phosphonate anions. Suitable electrolytes include, for example, salts of multivalent anions with monovalent cations, such as potassium pyrophosphate, potassium tripolyphosphate, and sodium citrate, salts of multivalent cations with monovalent anions, such as calcium chloride, calcium bromide, zinc halides, barium chloride, and calcium nitrate, and salts of monovalent cations with monovalent anions, such as sodium chloride, potassium chloride, potassium iodide, sodium bromide, ammonium bromide, alkali metal nitrates, and ammonium nitrates.

In one embodiment, the electrolyte comprises a monovalent cationic component and a monovalent anionic component, such as, for example, sodium chloride or ammonium chloride The initial concentration of electrolyte in the aqueous polyelectrolyte composition is typically greater than or equal to about 0.1 molar, more typically greater than about 0.5 molar. As used herein, the term "critical electrolyte concentration" ("$Is^0$"), means the minimum concentration of electrolyte effective to prevent co-assembly of the first and second polyelectrolytes (and below which co-assembly of the first and second polyelectrolytes occurs) under the conditions of interest. The critical electrolyte composition for a system is determined empirically for each system, for example, by the step-wise process described below. Typically, the response of each polyelectrolyte of interest to electrolyte concentration is first separately determined, typically by evaluating the stability of each of one or more aqueous dispersions of the polyelectrolyte, each containing a different relative amount of the polyelectrolyte, at two or more different electrolyte concentrations. The aqueous polyelectrolyte compositions are typically initially clear and optically transparent. Stability can be evaluated by light scattering to detect phase separation. For the purpose of the evaluation, stability is indicated by a lack of phase separation within a selected time period. If, upon determination of the electrolyte response of the two separate polyelectrolyte dispersions of interest, it is determined that each of the polyelectrolyte dispersions is stable within a time period of interest and within a common range of electrolyte concentration, then the electrolyte response of an aqueous dispersion of the two polyelectrolytes of interest is determined. This stability determination is again made by light scattering to detect phase separation of the aqueous dispersion of the two polyelectrolytes of interest at two or more different electrolyte concentrations. The electrolyte response of the aqueous dispersion of the two polyelectrolytes of interest allows determination of the bulk critical electrolyte concentration for that system.

In at least some embodiments, the critical electrolyte concentration below which co-assembly of the first and second polyelectrolytes occurs at the interface between the aqueous polyelectrolyte composition and the solid or other liquid phase is different, typically higher, than the bulk critical electrolyte concentration below which co-assembly of the first and second polyelectrolyte occurs in the bulk aqueous polyelectrolyte composition in the absence of such an interface.

D. Aqueous Polyelectrolyte Composition

The aqueous polyelectrolyte composition is typically made by adjusting the electrolyte content of an aqueous dispersion of the first polyelectrolyte to above the bulk critical electrolyte concentration for the proposed aqueous polyelectrolyte composition, adjusting the electrolyte content of an aqueous dispersion of the second polyelectrolyte to above the bulk critical electrolyte concentration for the proposed aqueous polyelectrolyte composition, and then mixing the electrolyte-adjusted aqueous dispersion of the first polyelectrolyte with the electrolyte-adjusted aqueous dispersion of the second polyelectrolyte to form the aqueous polyelectrolyte composition.

In one embodiment, the aqueous polyelectrolyte composition initially comprises:

(a) from about 0.05 to about 10, more typically from about 0.05 to about 5, and even more typically from about 0.05 to about 1 wt % of the first polyelectrolyte,
(b) from about 0.05 to about 10, more typically from about 0.05 to about 5, and even more typically from about 0.05 to about 1 wt %, of the second polyelectrolyte, and
(c) a molar concentration of dissolved electrolyte of greater than about 0.1, more typically greater than about 0.5.

E. Co-Assembly

In one embodiment, co-assembly of the polyelectrolytes is allowed by reducing the electrolyte concentration of the aqueous polyelectrolyte composition.

In one embodiment, the electrolyte concentration of the aqueous polyelectrolyte composition is reduced by dialysis of the aqueous polyelectrolyte composition to remove electrolyte from the composition.

In another embodiment, the electrolyte concentration of the aqueous polyelectrolyte composition is reduced by simply diluting the aqueous polyelectrolyte composition.

In one embodiment, co-assembly of the polyelectrolytes is allowed by forming an interface between the aqueous polyelectrolyte composition and a surface of a solid substrate or of second liquid phase, wherein the surface has an affinity for at least one of the polyelectrolytes. Since critical electrolyte concentration for interfacial co-assembly is typically at least slightly higher than the bulk critical electrolyte concentration for a given system, it is possible to adjust the electrolyte concentration to a level between the two respective critical concentrations and the allow co-assembly of the polyelectrolytes at a relevant interface with the aqueous polyelectrolyte composition simply by forming the interface, that is, without a need to reduce the concentration of electrolyte in the aqueous polyelectrolyte composition. In such a case, co-assembly ceases upon removal of the relevant interface. The above described phenomenon allows co-assembly of the first and second polyelectrolytes to form a polyelectrolyte layer at an interface without simultaneously forming co-assembled polyelectrolyte clusters in the bulk.

In another embodiment, co-assembly is allowed by forming an interface between the aqueous polyelectrolyte composition and a surface of a solid substrate or of second liquid phase, wherein the surface has an affinity for at least one of the polyelectrolytes, and reducing the concentration of electrolyte.

Reducing the electrolyte concentration of the aqueous polyelectrolyte composition to a level just below the critical electrolyte concentration typically results in slow formation and growth of co-assembled polyelectrolyte structures. Further reduction of the electrolyte concentration of the aqueous polyelectrolyte composition tends to increase the rate of growth.

Co-assembly can be halted by increasing the electrolyte concentration above the critical electrolyte concentration for the system.

The growth is a single step method that does not require successive steps. After a period of time, growth of the co-assembled polyelectrolyte structures typically stops. Growth can be typically resumed by further reduction of the electrolyte concentration of the aqueous polyelectrolyte composition.

In one embodiment, co-assembly is allowed to continue for a time of greater than 0 seconds, more typically from greater than 0 seconds to about $10^4$ seconds.

The ability to control rate of co-assembly via control of the ionic strength of the aqueous polyelectrolyte composition and the ability to control the duration of the co-assembly method allow a degree of control over the size of the co-assembled polyelectrolyte structures so produced. The kinetics of growth can be adapted so as to produce colloids in the range of the nanometer to tens of micrometers.

The method of the present invention is capable of producing stable colloids of particles having different selected morphologies, including spherical morphologies as well as elongated or planar morphologies.

In one embodiment, the morphology of the co-assembled polyelectrolyte structures formed by method of the present invention is tailored by conducting the co-assembly method while subjecting the aqueous polyelectrolyte composition to other influences, such as, for example, an external field, such as an electrostatic field, a magnetic field or a mechanical field, such as a pressure differential or a shearing force.

In one embodiment, polyelectrolyte structures comprising iron oxide particles are co-assembled under the influence of a magnetic field to produce elongated, "needle-shaped" structures having diameters of a few hundred nanometers and lengths in the range 3-30 μm. Thread-like co-assembled polyelectrolyte structures have been envisioned by using magnetic nanoparticles as a constituent. These particles are sensitive to externally applied magnetic field, in that they align along the direction of the field. Using this property, it is thus possible to grow polyelectrolyte structures in the bulk or at interfaces with preferred orientations. The targeted applications for magnetic nanorods are sensors and actuators. In one embodiment, the polyelectrolyte structures comprise quantum structures, such as quantum wires.

E.1. Co-Assembly in Bulk Aqueous Medium

In one embodiment, the first and second polyelectrolytes co-assemble to form discrete co-assembled polyelectrolyte structures in the bulk aqueous polyelectrolyte composition by reducing the electrolyte concentration of the aqueous polyelectrolyte composition below the bulk critical electrolyte concentration. Typically, the discrete co-assembled polyelectrolyte structures are in the form of submicrometic clusters comprising first and second polyelectrolytes.

In one embodiment, the co-assembled polyelectrolyte structures comprise clusters of two different organic polyelectrolyte macromolecules.

In one embodiment, the co-assembled polyelectrolyte structures are hybrid structures comprising clusters of organic polyelectrolyte macromolecules and inorganic polyelectrolyte particles.

The method of the present invention follows a generally "brick and mortar" type approach to constructing structures and allows fabrication of colloidal and supracolloidal co-assembled polyelectrolyte structures comprising inorganic nanoparticles. These colloids and supracolloidal co-assembled polyelectrolyte structures are very stable in dilution, concentration and salt content. In one embodiment, the building blocks of the constructs are on one hand anionically coated metal oxide nanocrystals and on the other hand polyelectrolyte-neutral block copolymers. Co-assembly can be monitored by electrostatic complexation occurring between the surface charges on the particles and the charged monomers of the cationic blocks. By a progressive adjustment of the ionic strength of the solution, spherical and thread-like co-assembled polyelectrolyte structures can be generated. Under those conditions (slow mixture or addition of salt) the co-assembled polyelectrolyte structures are formed by a nucleation/growth mechanism instead of a cluster/cluster co-assembly.

E.2. Co-Assembly at an Interface

The affinity of the solid or second liquid phase at least one of the first and second polyelectrolytes provides a driving force for attractive interaction between the polyelectrolyte and the solid or second liquid phase. The affinity may be through electrostatic forces, such as, for example, the presence of polar sites at the interface of the aqueous polyelectrolyte composition and such solid or second liquid phase, through hydrophobic interactions, such as the presence of nonpolar sites solid or second liquid phase, or through other forces, such as van der Waals forces.

Co-assembly of two reactive components can be achieved directly at interfaces using either a polyelectrolytic macromolecule/polyelectrolytic macromolecule or polyelectrolytic macromolecule/polyelectrolytic nanoparticle set of building blocks.

The method of the present invention can be used to assemble co-assembled polyelectrolyte layers at a liquid solid interface or at a liquid/liquid interface. The substrate can either be positively or negatively charged or neutral, such as polystyrene.

In one embodiment, a polyelectrolytic macromolecule/polyelectrolyte macromolecule or a hybrid polyelectrolytic inorganic nanoparticle/polyelectrolytic macromolecule co-assembled polyelectrolyte layer is assembled at an interface between the aqueous polyelectrolyte composition and a solid substrate.

The growth of a hybrid co-assembled polyelectrolytic inorganic nanoparticle/polyelectrolytic macromolecule polyelectrolyte structure is in many aspects very similar to that of a co-assembled polyelectrolytic macromolecule/polyelectrolyte macromolecule polyelectrolyte structure. but apparently differs in at least two respects, that is: i) the hybrid layer seems to growth indefinitely, and ii) the hybrid layer does not dissociate or desorb upon salt addition as in the case of the fully organic system. This very interesting characteristic is the interfacial translation/signature of the stability of hybrid assemblies formed in the bulk under high ionic strength. It should again be noted that the adsorption stops whenever the salt concentration is increased. As in the case of the organic layer, the as grown hybrid layer can be kept into pure water or in a dry state and subsequently be re-initiated at a later time.

The interfacial controlled growth of a layer composed of 2 different reactive components can be easily generalized to fluid/fluid interfaces and multiple components (more than two) with different nature ranging from purely organic charged materials (polyelectrolytes, proteins, viruses etc.) to inorganic charged colloids (nanoparticles, nanotubes etc.) or a combination of the two. This method offers the possibility to target spatially the functionalizing of an interface by placing a controlled quantity (droplet for example) of the "dormant" solution at the given position/location and eventually trigger the growth at any time by adding the "reactant" (water). It offers then a considerable advantage over the classical (and sometimes fastidious) layer by layer assembly method which does not permit either a spatial and/or triggered functionalization.

In one embodiment, the solid substrate is selected from organic materials, such organic polymers, organosilicon materials, inorganic material, such as ceramic materials or metallic materials, and composite materials. Suitable organic polymers include homopolymers, random copolymers, block copolymers, and polymer blends such as polyolefins, such as polyethylene, polypropylene, and polystyrene, polyacrylates, such as polymethylmethacrylate, halogenated polymers, such a polytetrafluoroethylene, conducting polymers such as polyacetylenes, polypyrroles, polythiophenes, polyanilines, polyfluorenes, poly(3-hexylthiophene), polynaphthalenes, poly(p-phenylene sulfide), poly(para-phenylene vinylene)s, engineering plastics such as polyamides, poly(ether ketones), polyimides, polycarbonates, polyesters and polyurethanes.

Suitable organosilicon polymers include, for example, polydimethylsiloxane. Suitable ceramics include, for example, alumina, zirconia, silica, silicone carbide, silicon nitride. Suitable metals include chromium, aluminum, iron, nickel, copper, platinum, paladium, gold and alloys of the above metals. Suitable composite materials include, for example, fiber or particle reinforced polymers, such as silica filled ethylene propylene diene rubber, carbon nanotube-polymer composites and metal particulate-filled polymers. Additional substrates also include materials such as fused glass, quartz, calcium fluoride, mica, silicon, germanium and indium tin oxide The substrate may be of any physical configuration, such as a shaped article, including for example, fibers, flat or shaped sheets, hollow tubes, spheres, or as a layer, which may be continuous or discontinuous, supported on a second substrate.

In one embodiment, the surface of the substrate is contacted with the aqueous polyelectrolyte composition by immersing the substrate in the aqueous polyelectrolyte composition.

The surface of the substrate is contacted with the aqueous polyelectrolyte composition for a period of time effective to allow deposition of a co-assembled layer of first and second polyelectrolytes from the aqueous polyelectrolyte composition onto at least a portion of the surface the substrate. For a given aqueous polyelectrolyte composition, longer contact time typically results in deposition of a greater quantity of co-assembled polyelectrolyte and a thicker co-assembled polyelectrolyte layer.

In one embodiment, the co-assembled polyelectrolyte layer modifies the chemical and/or physical properties, for example, the chemical reactivity and/or the surface energy, of the surface modified substrate of the present invention.

In one embodiment, the co-assembled polyelectrolyte layer of the surface modified substrate made according to the method of the present invention from a first aqueous polyelectrolyte composition has a net electrical charge and is itself suitable as a substrate upon which to assemble additional polyelectrolyte layers. In one embodiment, one or more additional polyelectrolyte layers are assembled on the surface modified substrate by iterative application of the method of the present invention. The additional layers may be co-assembled from the same aqueous polyelectrolyte composition or from different respective aqueous polyelectrolyte compositions.

In one embodiment, the surface modified substrate is a hydrophilized substrate, comprising a substrate initially having a hydrophobic surface and a polyelectrolyte layer disposed on at least a portion of such hydrophobic surface in an amount effective to increase the hydrophilicity of such portion of such hydrophobic surface.

As used herein, "hydrophobic surface" means a surface that exhibits a tendency to repel water and to thus resist being wetted by water, as evidenced by a contact angle with water of greater than or equal to 70°, more typically greater than or equal to 90°, "hydrophilic surface" means a surface that exhibits an affinity for water and to thus be wettable by water, as evidenced by a contact angle with water of less than 70°, more typically less than 60°, and even more typically less than 20°, and "hydrophilizing" a hydrophobic surface means rendering the surface more hydrophilic and thus less hydrophobic, as indicated by a decreased contact angle with water, wherein in each case, the contact angle with water is measured by a conventional image analysis method, that is, by disposing a droplet of water on the surface, typically a substantially flat surface, at 25° C., photographing the droplet, and measuring the contact angle shown in the photographic image.

One indication of increased hydrophilicity of a treated hydrophobic surface is a decreased contact angle of water droplets with a treated surface compared to the contact angle of water droplets with an untreated surface. Water droplet contact angle is awkward to determine with respect to a typical fiber due to the fiber surface configuration, which is due to the lack of a substantially flat surface. A water droplet contact angle measurement that is representative of the fiber surface can conveniently be made using a flat sheet or sample coupon of same material as the fiber of interest. Typically, the treated surface exhibits a water droplet contact angle of less than 70°, more typically less than 60°, even more typically, less than 45°.

Suitable substrates having hydrophobic surfaces include polyolefin substrates, such as polyethylene, polypropylene, and polystyrene, polyacrylate substrates, such as polymethylmethacrlate, halogenated polymer substrates, such as polytetrafluroethylene. and organosilicon polymer substrates such as polydimethylsiloxane.

In one embodiment, the substrate is a polyolefin sheet or shaped polyolefin article, such as, for example, a component of an automobile.

In each case, the surface treatment is durable and resists desorption from the substrate in the presence of water.

In one embodiment, hybrid co-assembled polyelectrolyte structures made by the method of the present invention are electrically conductive or electrically semi-conductive. The conductive properties such a structure can be tuned by selection of nanoscale polyelectrolytic inorganic particles comprising metallic or semi-conductive materials as one of the polyelectrolytes.

In one-embodiment, co-assembled polyelectrolyte structures made by the method of the present invention comprise inorganic nanoscale particles provide radiation absorbtion properties. The radiation absorbing properties of the layer can be tuned by selection of nanoscale polyelectrolytic inorganic particles as one of the polyelectrolytes. For example, cerium oxide, TiO2, and $Fe_2O_3$, each absorb radiation in the ultraviolet range and a layer of cerium oxide, $TiO_2$, and/or $Fe_2O_3$, particles provides ultraviolet radiation absorbing properties. Radiation absorbing coatings are useful, for example, to protect an underlying substrate, such as a synthetic polymer substrate, from radiation, such as ultraviolet radiation.

In one embodiment, the article of the present invention imparts hydrophilic properties to a surface of a substrate made from a hydrophobic material. The surface modified substrate of the present invention is useful as, for example, an article, such as a tube or a pipe, having a surface, such as the inner surface of a tube or pipe, having anti-fouling properties or as an article, for example, a kitchen or bathroom counter surface, having anti-soiling properties and/or water-sheeting, that is, hydrophilic, properties.

In addition to its robustness, one of the most conspicuous features of the invention described here is its simplicity. It requires no specific equipment, and can be made easily in any physical-chemistry facility.

Previous techniques for constructing polyelectrolyte multilayers require step-by-step addition of one polyelectrolyte layer at a time. Such processes can be time consuming and extremely tedious. The framework of resent invention, allows growth the co-assembled polyelectrolyte clusters or layers in a unique and controlled single step method.

The method of the present invention is believed to be applicable to all type of polyelectrolytic inorganic nanoparticles and all types of polyelectrolytic macromolecules.

EXAMPLE 1

Co-Assembly in Bulk Aqueous Medium

Figure 1:
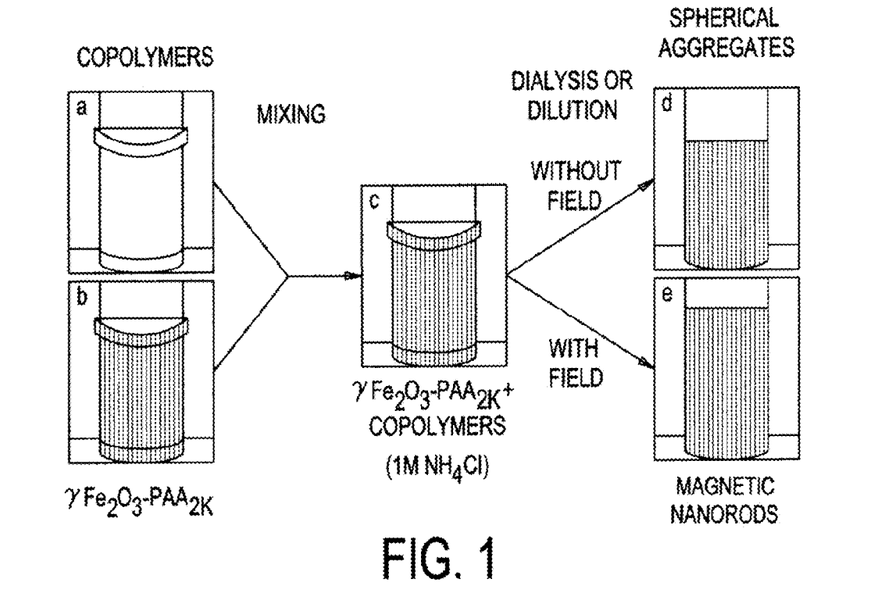
FIG. 1 shows a flow chart that illustrates protocols used in Example 1 of the present application for the fabrication of iron oxide nanoparticles clusters and rods.

Protocols adopted for the fabrication of iron oxide nanoparticles clusters and rods are illustrated in FIG. 1. The photographs show a protocol using a iron oxide nanoparticle dispersion as the primary constituent. The protocols displayed here is applicable for all type of nanoparticles. For particles that are not magnetic, such as cerium oxide nanoparticles, the application of a magnetic field is not required and only spherical co-assembled polyelectrolyte structures are obtained.

Solutions of poly(trimethylammonium ethylacrylate methylsulfate-b-poly(acrylamide) block copolymer (vial a in FIG. 1) and of polyacrylic acid (weight average molecular weight of about 2,000 ("PAA-2k")) coated iron oxide nanoparticles (vial b in FIG. 1) were prepared in 1 M ammonium chloride ($NH_4Cl$) at weight concentration c=0.2 wt. %. At this salt content, the Debye length is of the order of 0.3 nm and electrostatic interactions are screened. It was verified by dynamic light scattering that the colloidal stability of the initial dispersions was not disrupted by the high ammonium chloride content. The two solutions were then mixed, yielding a disperse solution where polymers and particles were not yet associated.

The electrostatic interactions between the oppositely charged species was then monitored by a slow removal of the salt, either by dialysis or by dilution.

Figure 2:
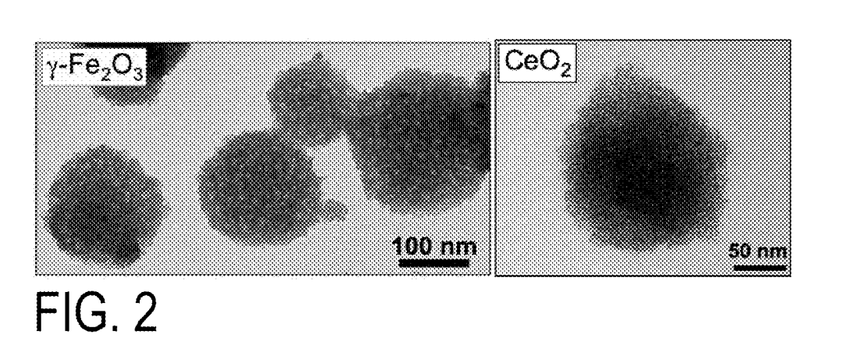
FIG. 2 shows transmission electron microscopy performed on iron oxide and cerium oxide dispersions of nanoparticles clusters.

In one alternative, the process of Example 1A, the salt concentration in the aqueous medium was reduced by dialysis of the aqueous medium. Here, we discuss the last step of the protocol displayed in FIG. 1, and in a first place the dialysis in absence of magnetic field (vial d). Dialysis using slide-a-lyzer cassette with 10 KD molecular weight cut-off was performed against de-ionized water during a period of one hour. The protocol was carried out on two types of particles, 7 nm cerium oxide particles and 7 nm iron oxide nanoparticles. Both dispersions were treated in the same way. FIG. 2 displays transmission electron microscopy (TEM) images of nanoparticle co-assembled polyelectrolyte clusters obtained in such a process. For iron oxide (left hand image), the co-assembled polyelectrolyte clusters displayed an average diameter of 180 nm, whereas for cerium oxide (right hand image of FIG. 2), the co-assembled polyelectrolyte clusters displayed an average diameter of 160 nm. The spherical shape of the clusters indicates that they were grown by nucleation and growth process. The polyelectrolyte clusters exhibited a remarkable colloidal stability with time, since no destabilization nor destruction of the constructs was underscored over period of months. Assuming a volume fraction of 0.30 inside the large spheres, we have estimated that a 180 nm co-assembled polyelectrolyte cluster was built from ~5000 particles.

In the other alternative, the process of Example 1B, the salt concentration in the aqueous medium was reduced by dilution of the aqueous medium. Dilution was monitored by slow addition of de-ionized water, at a rate that was compatible with that of the dialysis. This second protocol was achieved in order to allow a comparison with the previous method, and to access the intermediate ionic strength values between 1 M and 10 mM. As a result of slow dilution, an abrupt transition was found with decreasing ionic strength, at the critical value $I_S^0$=0.4 M. Below $I_S^0$, large co-assembled polyelectrolyte clusters with hydrodynamic diameters around 200 nm for iron and cerium oxide spontaneously formed through the association of the oppositely charged species. In terms of nanostructures, the results obtained by dilution agree well with those obtained by dialysis. Dialysis and dilution act thus similarly with respect to the control of the ionic strength. Both techniques are complimentary for the controlled morphology and size of inorganic clusters.

In a third experiment, dialysis of the mixed salted solutions was operated under a constant magnetic field of 0.1 Tesla. Once the ionic strength of the dialysis bath has reached its stationary value (as checked by conductimetry), the magnetic field was removed and the solutions were studied by transmission electron microscopy.

Figure 3:
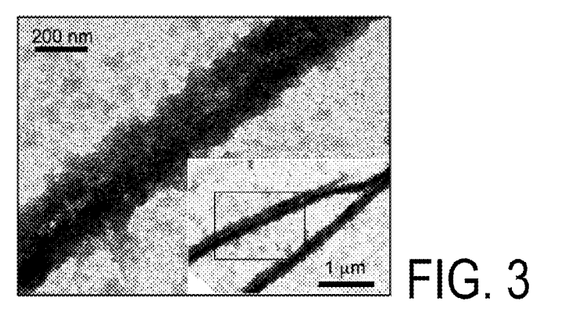
FIG. 3 shows transmission electron microscopy of iron oxide clusters that have grown under an externally applied magnetic field.
Figure 4:
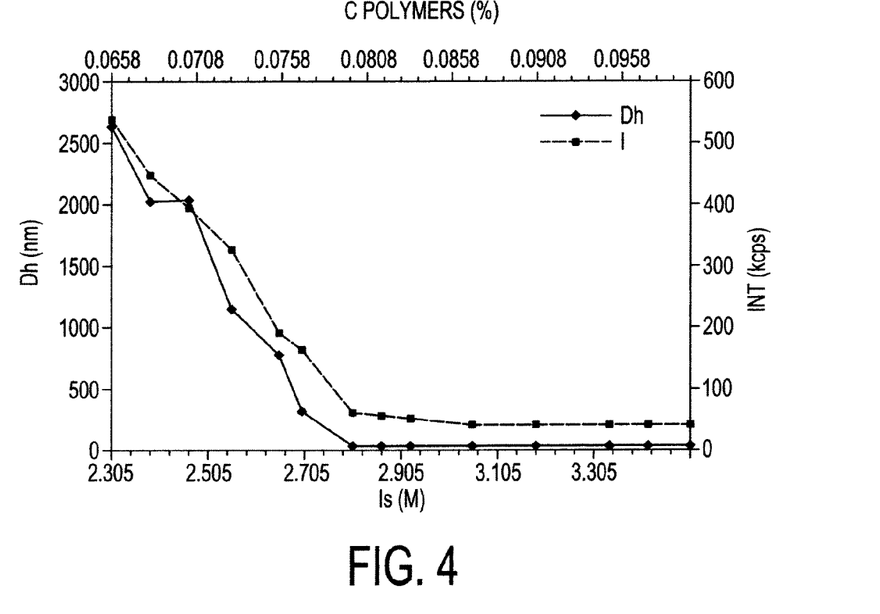
FIG. 4 shows scattering intensity and hydrodynamic diameter evolution with ionic strength Int=f(I) and Dh=f(I) for system MAPTAC+PSS (50/50=wt/wt) at c=0.1%. $Is^0$=2.85M is the critical ionic strength above which the electrostatic interaction between the two polyelectrolytes in bulk vanishes.

The inset and main frame of FIG. 3 exhibits TEM images of the above described nanostructured rods that had been made under the influence of a magnetic field at different scales. The nanorods were randomly oriented in absence of magnetic field. If a magnet was however brought near to them, the rods reoriented spontaneously and followed the external magnetic field. On a shorter scale (main frame), the linear threads were found to be constituted by a multitude of 7 nm nanoparticles, hold together by copolymers. In FIG. 4, the diameter of the nanorods was 250 nm, a value that compared well with the diameter of the spherical co-assembled polyelectrolyte clusters obtained previously (FIG. 2). For this specimen, image analysis has allowed to derive the length distribution of the rods, yielding an average length of 12 µm and a polydispersity of 0.50. It is important to note that as for the spherical co-assembled polyelectrolyte clusters, the nanorods did not display signs of destabilization, even after several months. Although the exact mechanism of growth of the one-dimensional co-assembled polyelectrolyte clusters is not known with accuracy, we anticipate that the nanostructured rods might result from the combination of a nucleation and growth process and of the alignment of some intermediate sized-co-assembled polyelectrolyte clusters driven by the magnetic field. In this respect, the present elongated and stiff structures bear some similarities with the filaments of magnetic microbeads recently designed for biomedical applications, see, e.g., L. Cohen-Tannoudji, E. Bertrand, L. Bressy, C. Goubault, J. Baudry, J. Klein, J. F. Joanny and J. Bibette, "*Polymer bridging probed by magnetic colloids,*" Physical Review Letters 94, (2005). The main differences here are the sizes of the initial particles and the stiffness of the final constructs. Assuming a volume fraction of magnetic material inside the rods of 30%, we have estimated the number of particles per micrometer of length at $10^6$.

EXAMPLE 2

Co-Assembly at Interfaces

In EXAMPLE 2A, cationic poly(methacrylamidopropyl trimonium chloride) homopolymer ("MAPTAC") having weight average molecular weight of from about 400,000 to about 1,000,000 and anionic poly(styrene sulfonate) homopolymer ("PSS") having a weight average molecular weight of about 70,000 were used as the first and second polyelectrolytes. The bulk salt concentration at which the attractive electrostatic interaction between the first and second polyelectrolytes was totally screened was determined as follows. Aqueous solutions of MAPTAC and of PSS at concentration of 0.1% by weight were prepared in 3.5M sodium chloride (NaCl). It was verified by dynamic light scattering (DLS) that the stability of each polyelectrolyte solution was not disrupted by the presence of high sodium chloride content. Both solutions were then mixed at equal mass quantity, yielding a clear dispersed solution where the positively charged polyelectrolytes are not yet associated. This dormant or non-reactive solution was then diluted gradually by a slow addition of deionized water to different ionic strengths. Scattering intensities and hydrodynamic diameters Dh were measured by static and dynamic light scattering at each stage. As a result of slow dilution, a transition was found with decreasing ionic strength, at the critical value of $Is^0$ equal to about 2.85 M NaCl in the bulk, as shown in FIG. 4. Below Iŝ, large co-assembled polyelectrolyte clusters of increasing size with decreasing ionic strength were formed through the co-assembly or association of oppositely charged species. It should be noted, that the formation of large organic co-assembled polyelectrolyte clusters is reversible (de-association) upon increasing the ionic strength indicating a purely (non specific) electrostatic interaction driven co-assembly.

The direct co-assembly of both polyelectrolytes at the silica/water interface was then monitored by the Quartz Crystal Microbalance (QCM) technique. A known quantity of dormant MAPTAC/PSS solution (initially prepared at c=0.1% and [NaCl]=3.5M) was introduced into the QCM cell with a vertically positioned silica surface (treated by UV light for 15 mins) in contact with the solution. At an initial ionic strength of Is=3.5M a single layer of MAPTAC adsorbed onto the negatively charged silica surface. An adsorption plateau (taken thereafter as the base line) of roughly 0.5 mg/m$^2$, typical for homopolyelectrolyte on silica was reached in a very short time. No further growth was observed (the electrostatic interaction between MAPTAC and PSS being totally screened). The ionic strength of the solution was then changed by a steady addition of DI water or saturated sodium chloride solution (36% by/w) with the help of a syringe pump (rate=0.5 ml/hours).

Figure 5:
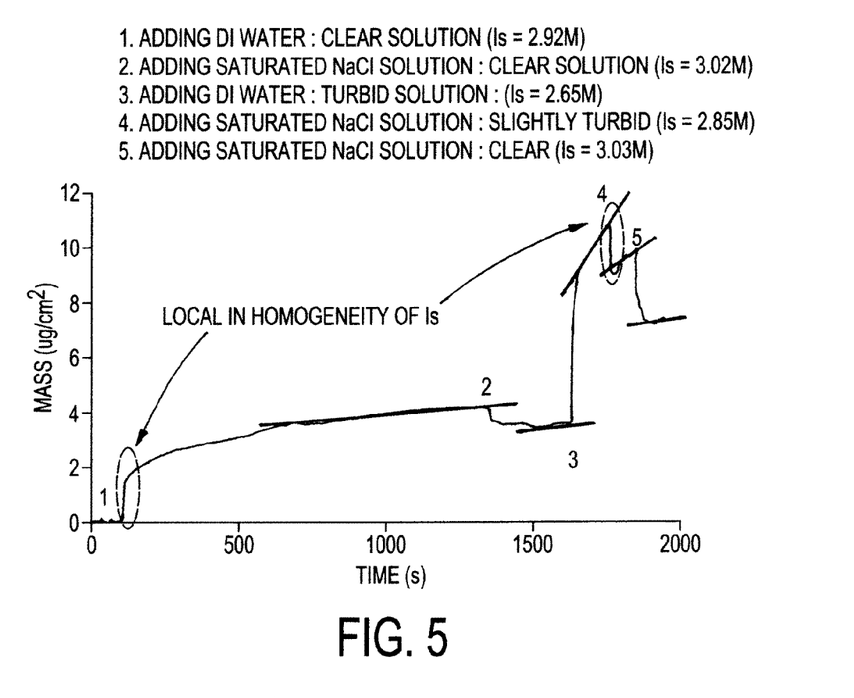
FIG. 5 shows QCM experiment at short timescale (<30 mins for each ionic strength) of adsorption of MAPTAC+PSS (50/50=wt/wt) at c=0.1% onto silica surface. The ionic strength was tuned by adding DI water or saturated sodium chloride solution.

Monitoring of the adsorption as a function of the ionic strength was performed at short (30 mn) and long (20 hours) timescale. It can be seen in FIG. 5 that generally i) adding DI water in (dilution) results in a sharp increase of the adsorption rate, while ii) adding saturated sodium chloride results in a sharp decrease. These features are likely a consequence of the reversibility of the interfacial co-assembly (and to a lesser extend to local transient inhomogeneity in salt concentration). Local higher ionic strength causes the dissolution of the adsorbed layer and local while lower ionic strength boosts the aggregation.

After homogenization of the solution, a steady state adsorption regime, depending on the solution ionic strength, is observed. As the ionic strength decreases, the electrostatic interaction gets stronger leading to a higher adsorption/growth rate. A key feature of this process was a critical ionic strength for interfacial co-assembly which is slightly higher than the bulk one (I=3.02 M versus 2.85 M). This later characteristic enables the growth at the solid/liquid interface without interferences coming from adsorption or precipitation of structures/assemblies preformed in the bulk solution.

Figure 6:
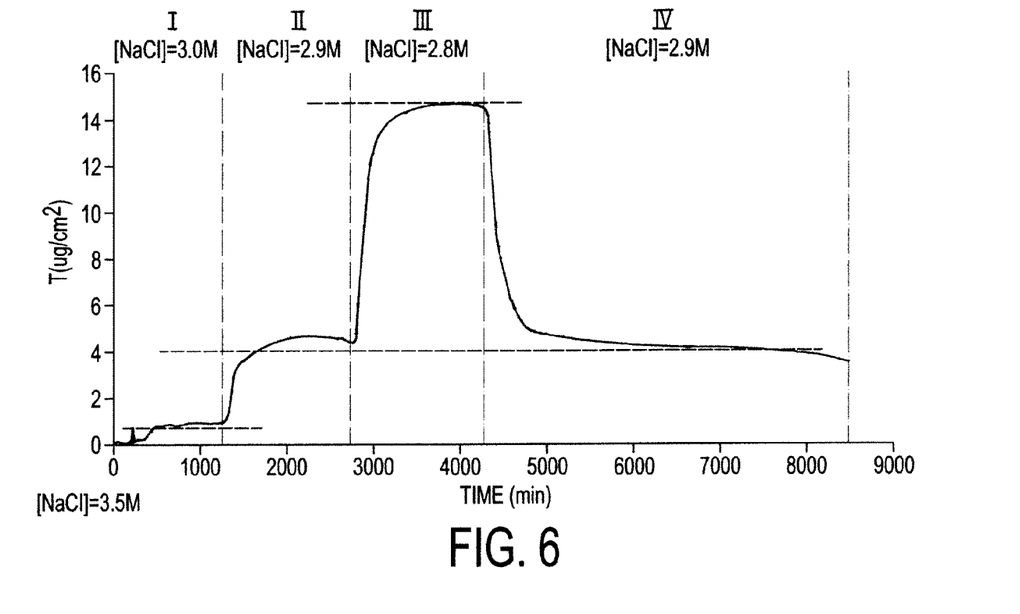
FIG. 6 shows QCM experiment at long timescale (>20 hours) of adsorption of MAPTAC+PSS (50/50=wt/wt) at c=0.1% onto silica surface. The ionic strength was tuned by adding DI water or saturated sodium chloride solution.
Figure 7:
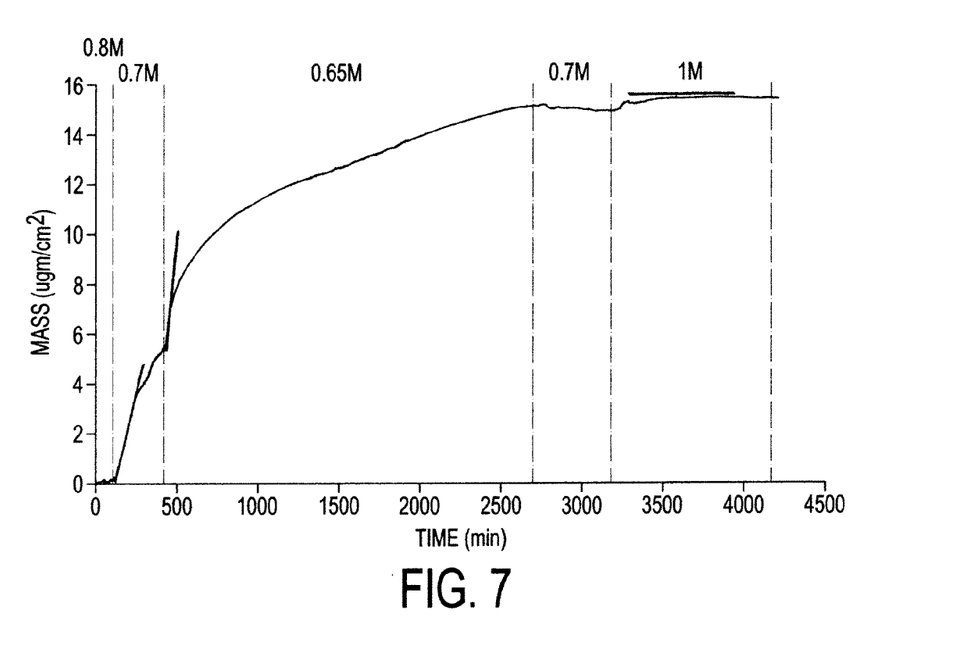
FIG. 7 shows QCM data on CeO2-PM+PDLAC X=1 c=0.1% adsorption onto silica surface in presence of different [NH4Cl].

In FIG. 6, it can be seen that for a given ionic strength, the interfacial assembly does not growth indefinitely as was initially expected but eventually stops and reach a plateau after tens of hours. By decreasing slightly the ionic strength, it is possible to re-initiate the growth. The later rules out the hypothesis of a lack of material (polyelectrolytes) in the bulk solution as a possible explanation for the observed stop of the growth (plateau). Adsorption/desorption is reversible by adding either pure water or saturated salt solution. The final adsorption amount depends solely on the final ionic strength and not to the adsorption history. The as grown organic layer is stable in aqueous solution with ionic strength lower than the one at which it has been grown. The functionalized substrate can be kept into water or in a dry state and growth can be re-initiated at a later time if needed (with a different set of reactive species for example).

In the process of EXAMPLE 2B, the polyelectrolytes were a polyelectrolytic homopolymer (poly(diallyldimethylammonium chloride) ("PDLAC") having cationic substituent groups and a weight average molecular weight of about 100,000) and charged inorganic particles (anionic PAA-2k coated cerium oxide nanoparticles (about 10 nm in diameter)). In this system the critical ionic strength that screen entirely the bulk interaction between the components was found to be 0.6M. Adsorption onto a silica surface was then monitored via QCM. As in the case of the polyelectrolytic polymer system described in EXAMPLE 2A, the adsorption starts at an ionic strength of about 0.7M, which is slightly higher than the bulk critical electrolyte concentration measured in the bulk (DLS experiments show a "clear" solution).

The hybrid polyelectrolytic inorganic nanoparticle/polyelectrolytic macromolecule co-assembled polyelectrolyte layer was found to grow indefinitely with an adsorbed amount of hybrid material after 45 hours around 150 mg/m$^2$ (compared to a single layer of nanoceria particles or macromolecules, which is typically 5 and 0.5 mg/m$^2$ respectively). The hybrid layer was found to not dissociate or desorb upon salt addition as in the case of the fully organic system.

This approach was used to render a silica surface superhydrophilic (instantaneous spreading of a water droplet) by growing a porous layer constituted of nanoparticles bound together by the polyelectrolytes. The layer by layer method was used in the past but necessitated numerous dipping-rinsing-dipping cycles to get the same final result. Furthermore, putting a droplet of "dormant solution" in middle a PS surface enables the creation of a superhydrophilic spot (~droplet size) surrounded by a hydrophobic area.

The invention claimed is:

1. A co-assembly method, comprising the step of allowing, in an aqueous polyelectrolyte composition comprising
   (a) a first polyelectrolyte dispersed in the composition and having a net electric charge of a first polarity,
   (b) a second polyelectrolyte dispersed in the composition and having a net electric charge of a second polarity, wherein the second polarity is opposite the first polarity, and
   (c) an electrolyte dissolved in the composition in a concentration effective to prevent co-assembly of the polyelectrolytes,
co-assembly of the polyelectrolytes by:
   (1) decreasing the concentration of the electrolyte, or
   (2) forming an interface between the aqueous polyelectrolyte composition and a surface of a solid substrate or of a second liquid phase, wherein the surface has an affinity for at least one of the polyelectrolytes, or
   (3) (1) and (2),
   wherein the method has at least one feature selected from the group consisting of:
      (i) at least one member of the group consisting of the first polyelectrolyte and the second polyelectrolyte comprises nanoscale polyelectrolytic inorganic particles, and
      (ii) the first polyelectrolyte and the second polyelectrolyte are linear polymers.

2. The method of claim 1, wherein the first and second polyelectrolytes each comprise respective linear polyelectrolytic organic macromolecules.

3. The method of claim 1, wherein the first and second polyelectrolytes each comprise respective nanoscale polyelectrolytic inorganic particles.

4. The method of claim 1, wherein one polyelectrolyte comprises nanoscale polyelectrolytic inorganic particles and the other polyelectrolyte comprises polyelectrolytic organic macromolecules.

5. The process of claim 1, wherein the aqueous polyelectrolyte composition further comprises at least one additional polyelectrolyte in addition to the first and second polyelectrolytes, each said additional polyelectrolyte having a net electric charge of the first polarity or of the second polarity, the electrolyte is dissolved in the composition in a concentration effective to prevent co-assembly of first, second, and additional polyelectrolytes, and the step of decreasing the concentration of the dissolved electrolyte allows co-assembly of first, second, and additional polyelectrolytes.

6. The method of claim 1, wherein co-assembly of polyelectrolytes forms discrete submicrometic polyelectrolyte clusters in the bulk aqueous polyelectrolyte composition.

7. The method of claim 1, comprising of forming the interface between the aqueous polyelectrolyte composition and the surface of the solid substrate or of the second liquid phase, wherein the surface has the affinity for at least one of the polyelectrolytes, and wherein the co-assembly of polyelectrolytes forms a polyelectrolyte layer at the interface.

8. The method of claim 7, wherein, the interface is between the aqueous polyelectrolyte composition and the surface of the solid substrate, wherein the polyelectrolyte layer is disposed on at least a portion of the surface of the solid substrate.

9. Submicrometic polyelectrolyte clusters made by the method of claim 6.

10. A polyelectrolyte layer made by the method of claim 7.

11. A surface modified solid substrate made by the method of claim 8, comprising the solid substrate and wherein the polyelectrolyte layer is disposed on at least a portion of the surface of the solid substrate.

12. An aqueous polyelectrolyte composition comprising:
   (a) a first polyelectrolyte dispersed in the composition and having a net electric charge of a first polarity,
   (b) a second polyelectrolyte dispersed in the composition and having a net electric charge of a second polarity, wherein the second polarity is opposite the first polarity, and
   (c) an electrolyte dissolved in the composition in a concentration effective to prevent co-assembly of the polyelectrolytes,
   wherein the composition comprises at least one member selected from the group consisting of:
      (i) at least one member of the group consisting of the first polyelectrolyte and the second polyelectrolyte comprises nanoscale polyelectrolytic inorganic particles and
      (ii) the first polyelectrolyte and the second polyelectrolyte are linear polymers.

13. The composition of claim 12, wherein the first and second polyelectrolytes each comprise respective linear polyelectrolytic organic macromolecules.

14. The composition of claim 12, wherein the first and second polyelectrolytes each comprise respective nanoscale polyelectrolytic inorganic particles.

15. The composition of claim 12, wherein one polyelectrolyte comprises nanoscale polyelectrolytic inorganic particles and the other polyelectrolyte comprises polyelectrolytic organic macromolecules.

16. A co-assembly method, comprising the step of allowing, in an aqueous polyelectrolyte composition comprising (a) a first polyelectrolyte dispersed in the composition and having a net electric charge of a first polarity,
(b) a second polyelectrolyte dispersed in the composition and having a net electric charge of a second polarity, wherein the second polarity is opposite the first polarity, and
(c) an electrolyte dissolved in the composition in a concentration effective to prevent co-assembly of the polyelectrolytes, co-assembly of the polyelectrolytes by: decreasing the concentration of the electrolyte by dialysis of the aqueous polyelectrolyte composition.

17. The method of claim 16, wherein the first and second polyelectrolytes each comprise respective linear polyelectrolytic organic macromolecules.

18. The method of claim 16, wherein the first and second polyelectrolytes each comprise respective nanoscale polyelectrolytic inorganic particles.

19. The method of claim 16, wherein one polyelectrolyte comprises nanoscale polyelectrolytic inorganic particles and the other polyelectrolyte comprises polyelectrolytic organic macromolecules.

20. A co-assembly method, comprising the step of allowing, in an aqueous polyelectrolyte composition comprising
(a) a first polyelectrolyte dispersed in the composition and having a net electric charge of a first polarity,
(b) a second polyelectrolyte dispersed in the composition and having a net electric charge of a second polarity, wherein the second polarity is opposite the first polarity, and
(c) an electrolyte dissolved in the composition in a concentration effective to prevent co-assembly of the polyelectrolytes, co-assembly of the polyelectrolytes by:
(1) decreasing the concentration of the electrolyte, or
(2) forming an interface between the aqueous polyelectrolyte composition and a surface of a solid substrate or of a second liquid phase, wherein the surface has an affinity for at least one of the polyelectrolytes, or
(3) (1) and (2),
wherein said co-assembly is conducted while subjecting the aqueous polyelectrolyte composition to an external field selected from the group consisting of an electrostatic field, a magnetic field and a mechanical field,
said mechanical field selected from the group consisting of a pressure differential and a shearing force.

21. The method of claim 20, wherein at least one member of the group consisting of the first polyelectrolyte and the second polyelectrolyte comprises nanoscale polyelectrolytic inorganic particles,
wherein the nanoscale polyelectrolytic inorganic particles comprise iron oxide and said co-assembly is conducted while subjecting the aqueous polyelectrolyte composition to an external magnetic field to produce needle shaped structures.

* * * * *